United States Patent [19]

Cocklin

[11] 4,372,051

[45] Feb. 8, 1983

[54] SPARK PLUG WIRE GAUGE

[76] Inventor: Richard F. Cocklin, 3226 Diamond St., NE., North Canton, Ohio 44721

[21] Appl. No.: 297,783

[22] Filed: Aug. 31, 1981

[51] Int. Cl.³ .............................................. G01B 5/02
[52] U.S. Cl. ..................................... 33/174 R; 33/127
[58] Field of Search ................. 33/125 R, 127, 174 R, 33/178 B, 179, 180 AT, 181 AT, DIG. 7, DIG. 13

[56] References Cited

U.S. PATENT DOCUMENTS

| | | | |
|---|---|---|---|
| 255,764 | 4/1882 | Brubaker | 33/125 R |
| 1,904,048 | 4/1933 | Hill | 33/174 R |
| 1,958,864 | 5/1934 | Richardson | 33/179 |
| 2,262,664 | 11/1941 | Bresson | 33/179 |
| 2,494,168 | 1/1950 | Forslund et al. | 33/178 B |
| 3,407,507 | 10/1968 | Brubaker | 33/179 |
| 3,696,511 | 10/1972 | Bixler et al. | 33/125 R |
| 3,711,952 | 1/1973 | Justason | 33/125 R |
| 3,888,014 | 6/1975 | Bixler | 33/174 R |

FOREIGN PATENT DOCUMENTS 1156328 10/1963 Fed. Rep. of Germany ........ 33/127

Primary Examiner—Richard R. Stearns
Attorney, Agent, or Firm—Frease & Bishop

[57] ABSTRACT

A gauge for accurately measuring and ascertaining the length of a spark plug wire and a manufacture's replacement part number for the measured wire. The gauge has a disc-shaped body preferably molded of a lightweight rugged foam plastic material. A groove is formed in the peripheral edge of the disc. A hole is formed in the body of the disc either adjacent to the edge groove or in the groove. The distributor end of a spark plug wire has an L-shaped terminal which is inserted into the disc hole with the wire being placed in and extending along the edge groove. Measurement indication marks corresponding to the lengths of the wire placed in the edge groove are printed or embossed on the disc along the circumference thereof together with the part numbers of various manufacturers which correspond to the wire lengths. The end of the spark plug wire being measured will align with one of the measurement lengths and part numbers, providing a mechanic with the length of the wire in inches simultaneously with a manufacturer's identification number of a replacement for the spark plug wire.

12 Claims, 12 Drawing Figures

SPARK PLUG WIRE GAUGE

BACKGROUND OF THE INVENTION

1. Field of the Invention

The invention relates to measuring devices and particularly to a device for measuring the length of spark plug wires. More particularly, the invention relates to an extremely simple and inexpensive device for rapidly measuring the length of a spark plug wire and simultaneously determining the appropriate manufacturer's replacement part number for the measured wire.

2. Description of the Prior Art

Internal combustion engines for automobiles use a plurality of spark plug wires, usually four, six or eight, depending upon the number of engine cylinders, which extend between the distributor and the individual spark plugs. The lengths and types of spark plug wires vary for the various vehicle engines. Also, the lengths of the wires will vary for the individual spark plug wires for a particular engine. Thus, a single engine may require several different lengths of spark plug wires. This presents a problem for stocking and maintaining a supply of spark plug wires required for replacements due to the considerable number and lengths of wires. To replace a worn-out spark plug wire, the old wire has to be measured with a tape or ruler to determine its length and then cross checked against various manufacturers' parts supply tables to determine the manufacturer's replacement part number for the damaged wire.

There are a considerable number of manufacturers of such spark plug replacement wires, all of which have their own individual part numbering and coding system. The replacement number depends upon the particular length of the spark plug wire as well as the engine for which the replacement wire is needed. Also, there are two general types of spark plug wires, depending upon the spark plug end terminal being either a straight line terminal or an L-shaped elbow terminal. The distributor end of the spark plug wires almost always has an L-shaped or elbow terminal. attached thereto.

Many manufacturers will supply the auto supply store or mechanic with a bundle of wires for replacing all of the wires of a particular size and type of engine. However, in many situations only one or two wires need to be replaced, which requires measuring each of the individual wires to be replaced as well as the new wires to determine the replacement wire or wires therefor. This results in broken packages of spark plug wires and the resulting increased cost due to the excessive inventory.

There is no known device or gauge of which I am aware which enables a spark plug wire to be measured quickly and conveniently and which provides the mechanic with the length of the spark plug wire simultaneously with the replacement part therefor of various manufacturers.

SUMMARY OF THE INVENTION

Objectives of the invention include providing a spark plug wire gauge which is formed of a lightweight, inexpensive material, preferably foam plastic, which can be mounted on a wall or other convenient location in a garage or service area, and in which the gauge can have various advertisements or other information printed on the face of the gauge without affecting the gauge's function. Another objective is to provide such a gauge in which replacement part information of various manufacturers can be printed or placed on both sides of the gauge, thereby providing for a well-organized placement of the desired information on the gauge without excessively cluttering the information contained thereon on one side, and in which the printed information can be color coded with the information pertaining to the spark plug wires having a straight end connector being of one color and the L-shaped connector-type plug wires being of a different color, facilitating even further the obtaining of the required information by a mechanic, and in which the actual length of the wire in inches also can be printed or embossed in the gauge disc. Another objective is to provide such a gauge in which a groove is molded in the outer peripheral edge of the disc-shaped body, and in which the L-shaped distributor end terminal of the wire is adapted to be inserted into an opening formed either in the disc surface or edge groove, whereupon the mechanic will lay the wire in the edge groove and read the replacement part directly from the information printed on the surface of the gauge, in which such measurement requires the mechanic to use only one hand, and in which there are no movable parts on the gauge subject to breakage or manipulation, as in prior gauge constructions.

Still another objective is to provide such a gauge which will accommodate all usual lengths of spark plug wires by merely molding the disc-shaped gauge in the desired diameter, in which the gauge is extremely durable and can be manufactured at extremely low cost, and in which the gauge eliminates problems existing with known spark plug wire measuring devices and methods, and which satisfies needs and obtains new results in the art.

These objectives and advantages are obtained by the spark plug wire gauge of the invention, the general nature of which may be stated as including a generally disc-shaped body having an outer peripheral edge; a groove formed in at least a portion of the outer peripheral edge; means provided on the disc-shaped body for detachably holding one of the end terminals of a spark plug wire with the wire being adapted to be received in and laid along said edge groove; and markings provided on the disc-shaped body at predetermined spaced locations along and adjacent to the peripheral edge groove for indicating the length of a spark plug wire placed in the groove by a particular one of the markings adjacent the other end terminal of the spark plug wire.

BRIEF DESCRIPTION OF THE DRAWINGS

Preferred embodiments of the invention, illustrative of the best modes in which applicant has contemplated applying the principles, are set forth in the following description and shown in the drawings, and are particularly and distinctly pointed out and set forth in the appended claims.

Similar numerals refer to similar parts throughout the drawings.

DESCRIPTION OF THE PREFERRED EMBODIMENTS

First Embodiment

Figure 1:
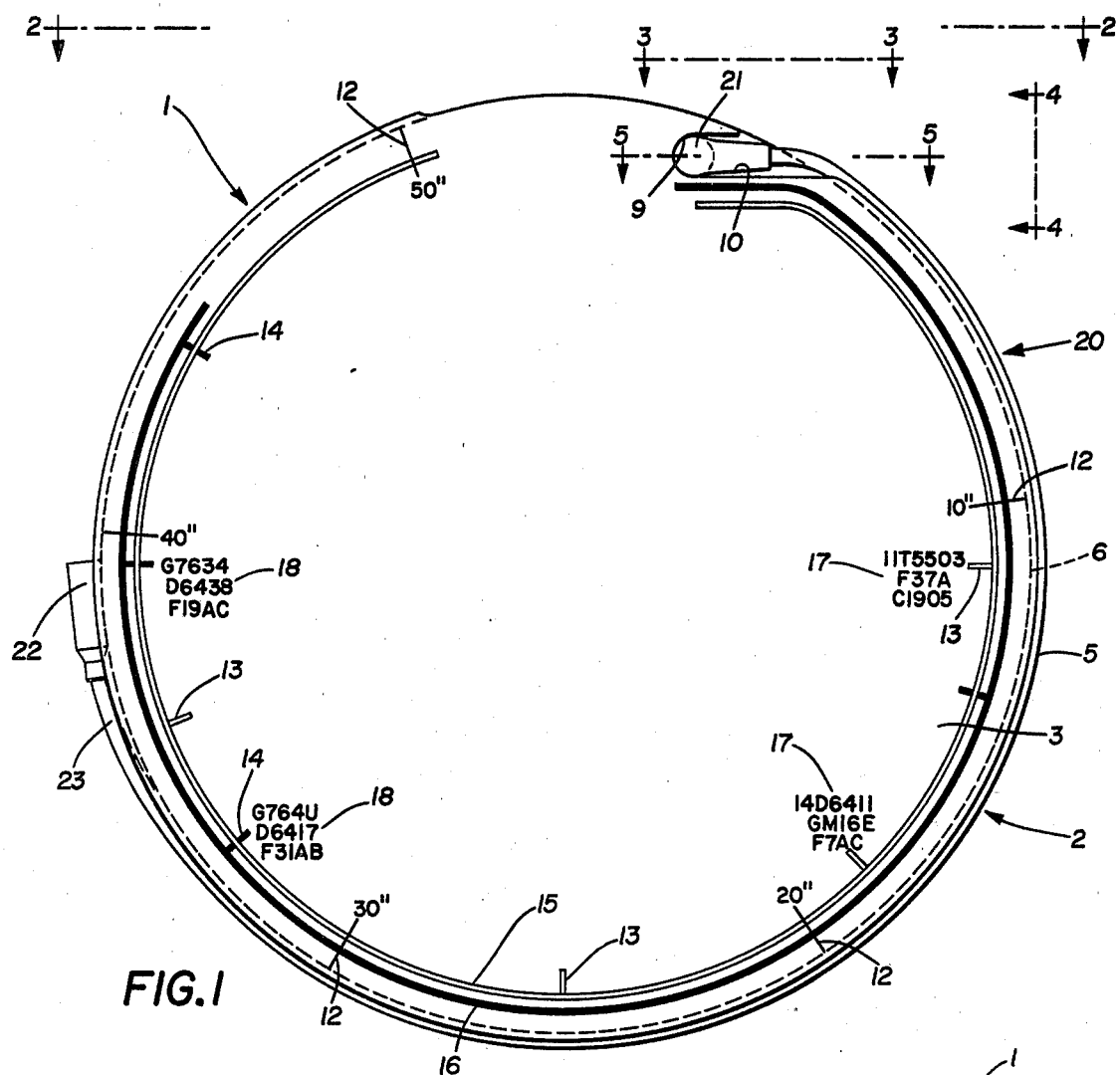
FIG. 1 is a plan view of the spark plug wire gauge with a spark plug wire being measured thereby.

The improved spark plug wire gauge is indicated generally at 1, and a first embodiment thereof is shown in FIGS. 1–5. Gauge 1 has a generally disc-shaped body 2 having a circular front surface 3 and a similar circular rear surface 4 which are joined by a peripheral edge 5. Disc 2 preferably is molded of a lightweight rugged foam plastic material such as polyethelyne, which provides an extremely lightweight yet rugged construction which is unaffected by the grease and oil to which it will be exposed. If desired, disc 2 can be formed of metal, wood or other material without affecting the concept of the invention.

Figure 2:
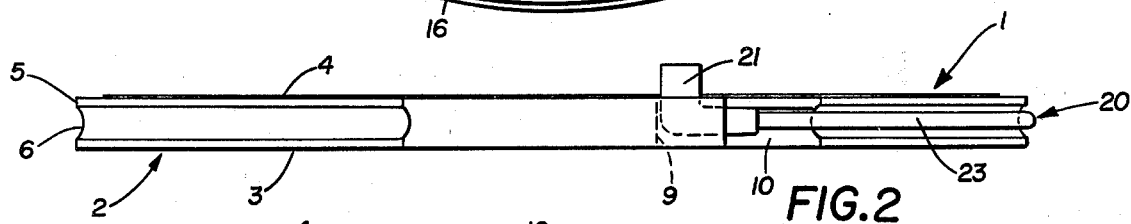
FIG. 2 is an end elevational view of the gauge looking in the direction of arrows 2—2, FIG. 1.
Figure 3:
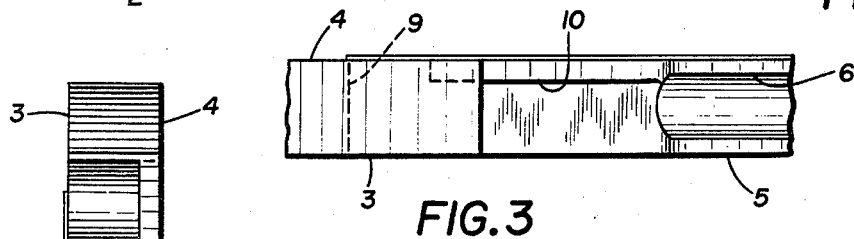
FIG. 3 is an enlarged fragmentary elevational view looking in the direction of arrows 3—3, FIG. 1, with the spark plug wire being removed.
Figure 4:
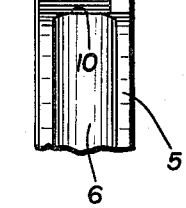
FIG. 4 is an enlarged fragmentary elevational view looking in the direction of arrows 4—4, FIG. 1, with the spark plug wire being removed.
Figure 5:
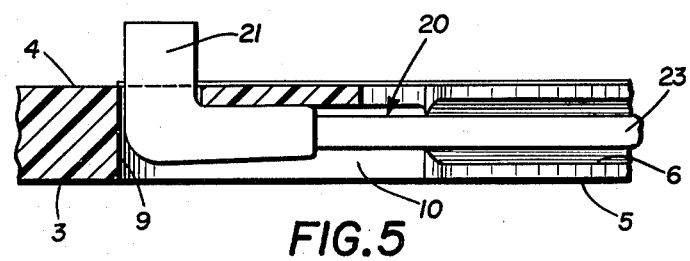
FIG. 5 is an enlarged fragmentary sectional view taken on line 5—5, FIG. 1.

In accordance with another feature of the invention, disc 2 is formed with a groove 6 in outer edge 5 which extends generally about the circumference of disc 2. Groove 6 preferably has a generally U-shaped or concave configuration and extends generally between front and rear surfaces 3 and 4. A circular hole 9 is formed in disc 2 closely adjacent edge 5. Hole 9 may extend a predetermined distance into disc 2 from top surface 3 or extend completely through the disc, as shown in FIGS. 2, 3 and 5. A slot 10 also is formed in surface 3 of disc 2 and extends between hole 9 and edge groove 6.

A plurality of length-indicating marks 12 are placed on disc surface 3 adjacent edge 5 and are spaced along the disc periphery. Marks 12 preferably are embossed on surface 3 and indicate in inches the length of a spark plug wire being measured by gauge 1. In accordance with one of the features of the invention, a plurality of part number indicating marks 13 and 14 extend radially inwardly from a pair of circularly extending lines 15 and 16, respectively, which extend about the circumference of disc 2 closely adjacent edge 5. A plurality of part-identifying indicia 17 and 18 are printed on disc surface 3 adjacent appropriate indicating marks 13 and 14, respectively. Part numbers 17 and 18 are the various manufacturers' spark plug wire catalog or replacement part numbers for spark plug wires of various lengths.

Most spark plug wires will have an L-shaped terminal at one end of the wire which is referred to as the distributor end for connecting the wire to the distributor of the engine, and the opposite ends of the spark plug wire will generally have a straight terminal or an L-shaped terminal similar to the distributor end terminal. This opposite end is referred to as the spark plug wire end and is adapted to be connected to the individual spark plug of the engine. Indicating lines 15 and 16 and their respective part number indicating indicia correspond to either an L-shaped spark plug wire end terminal or a straight end terminal since these different end terminals require a different part number spark plug wire replacement. Thus, indicating line 15 and marks 13 are for L-shaped end terminals and line 16 and marks 14 are for straight-end terminals.

FIGS. 1, 2 and 5 show gauge 1 being used to measure a usual spark plug wire, indicated generally at 20. Spark plug wire 20 is of the type having L-shaped terminal 21 at the distributor end and a straight terminal 22 at the spark plug end with a predetermined length of wire 23 extending therebetween. Spark plug wire 20 represents a used spark plug wire for which a replacement wire is to be determined by gauge 1. In using gauge 1, end 21 is inserted into hole 9 and laid along slot 10 and edge groove 6, as shown in FIG. 1. The location of spark plug end terminal 22 provides an immediate indication to the mechanic of the various manufacturers' part numbers needed to replace existing wire 20. For example, as shown in FIG. 1, since spark plug end terminal 22 has a straight configuration, the required information will be obtained from indicating line 16. The part number identifying indicia 18 adjacent indicating marks 14 provides the mechanic with three different manufacturers' part numbers from which to choose a spark plug wire replacement. The part or model number needed is selected from the group of numbers closest to the appropriate mark 14 for straight end terminals or to a part number of the next longest spark plug wire. The mechanic only needs to go to his stock and pull out one of the three manufacturers' spark plug replacement wires, knowing that the same is of the proper length for use as a replacement for spark plug wire 20. For spark plug wires having L-shaped terminals on the spark plug wire end, the part replacement number will be read from the indicia corresponding to the inner circular line 15 and radially extending marks 13, instead of the outer line 16 and marks 14, as described above with respect to a straight spark plug wire end terminal. Thus, the mechanic need only place the distributor end of the wire in hole 9 and extend the spark plug wire about disc-shaped body 2, whereupon gauge 1 will provide an immediate indication of the length of the wire in inches obtained from length-indicating marks 12, as well as the replacement part number of various manufacturers.

Second Embodiment

Figure 6:
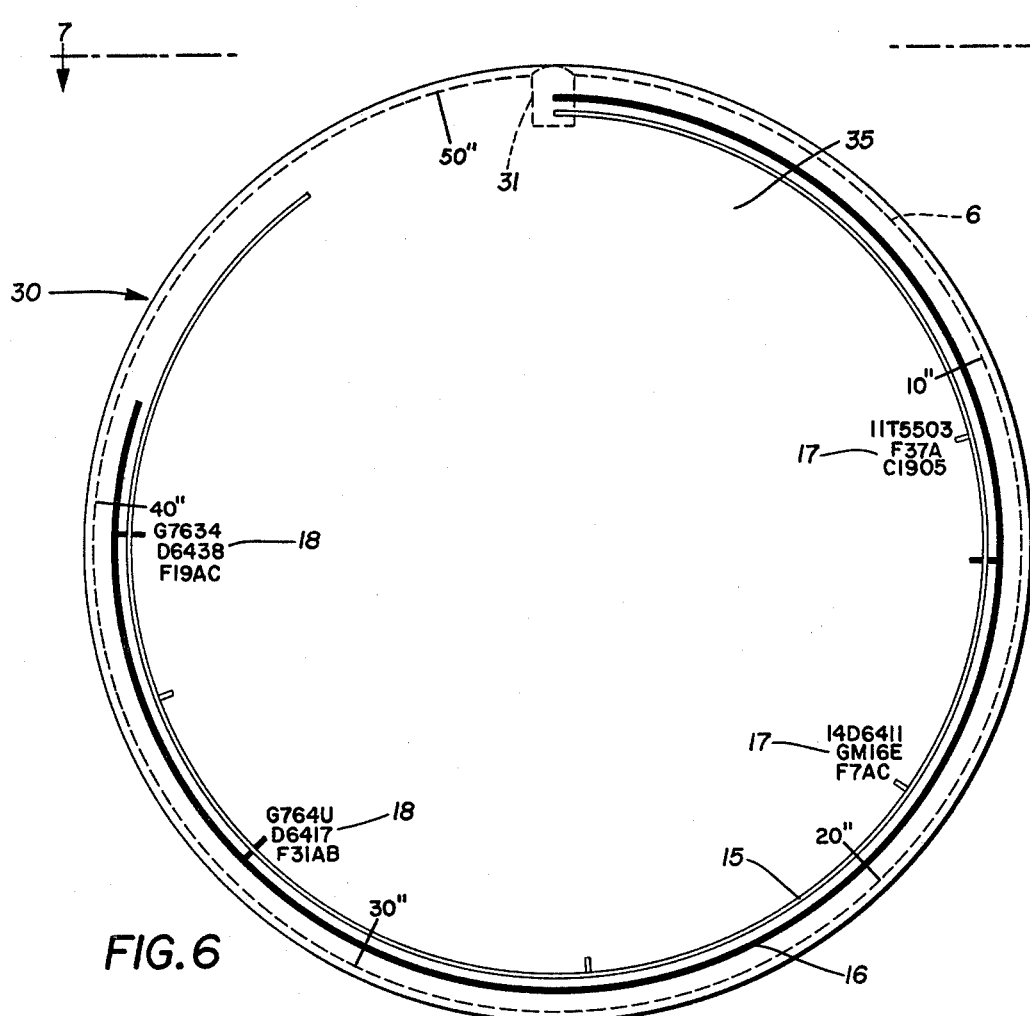
FIG. 6 is a plan view similar to FIG. 1 showing a second embodiment of the spark plug wire gauge.
Figure 7:
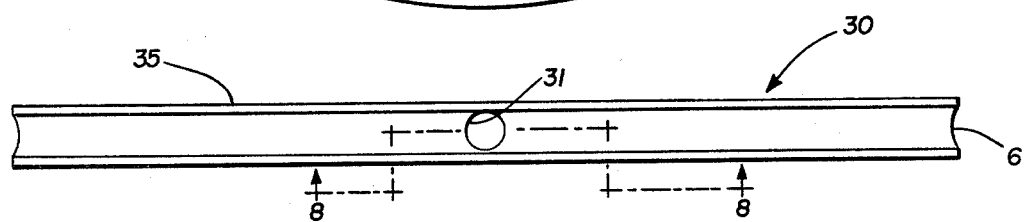
FIG. 7 is an end elevational view looking in the direction of arrows 7—7, FIG. 6.
Figure 8:
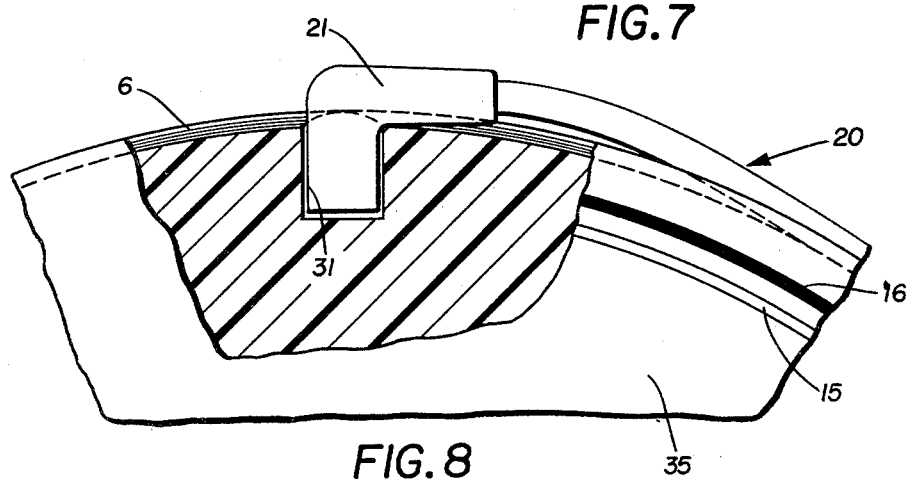
FIG. 8 is an enlarged fragmentary sectional view taken on line 8—8, FIG. 7, with a spark plug wire being measured thereby.
Figure 9:
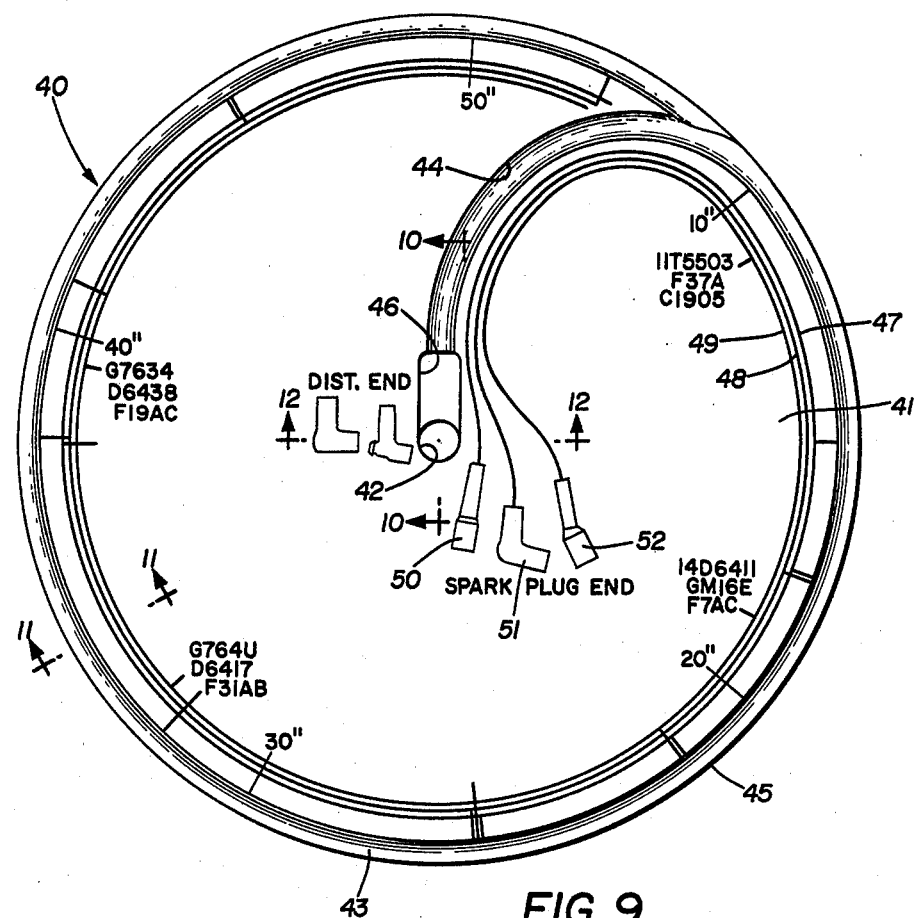
FIG. 9 is a plan view similar to FIGS. 1 and 6 showing a third embodiment of the spark plug wire gauge.
Figure 10:
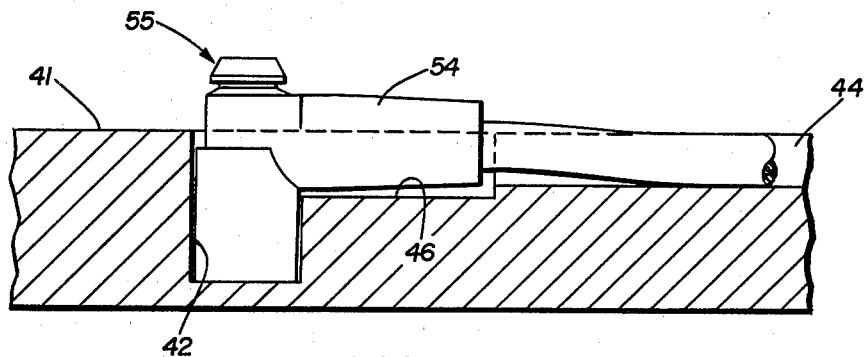
FIG. 10 is an enlarged fragmentary sectional view taken on line 10—10, FIG. 9, with a spark plug wire being shown therein.
Figure 11:
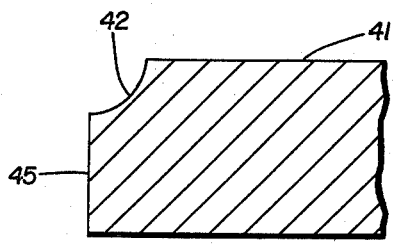
FIG. 11 is an enlarged fragmentary sectional view taken on line 11—11, FIG. 9.
Figure 12:
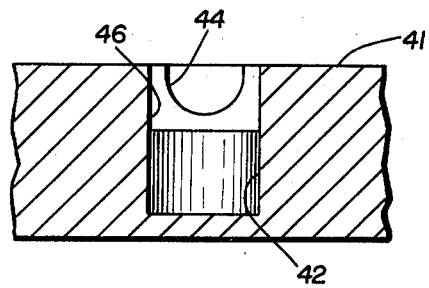
FIG. 12 is an enlarged fragmentary sectional view taken on line 12—12, FIG. 9.

A modified form of the invention is shown in FIGS. 6, 7 and 8, and is indicated generally at 30. Embodiment 30 is similar to the embodiment of gauge 1 described above except that the distributor end receiving hole, indicated generally at 31, is formed in edge groove 6 instead of in the body of the disc, as in gauge 1. The operation of embodiment 30 is similar to that of embodiment 1 except that the L-shaped distributor end terminal 21 of spark plug wire 20 is inserted into edge hole 31, as shown in FIG. 8, with the wire extending about and lying within edge groove 6. The part number indicia 17 and 18 and corresponding circular lines 15 and 16 are printed on disc surface 35 at the required locations to provide the correct replacement part number information, as in gauge 1.

Third Embodiment

A third embodiment of the spark plug wire gauge is indicated generally at 40, and is shown in FIGS. 9–12. Embodiment 40 is similar to embodiments 1 and 30 described above except that the distributor end-receiving hole, indicated at 42, is formed at the center of disc-shaped body 41. Hole 42 is connected with a peripheral groove 43 by a curved slot 44. Groove 43 (FIG. 11) is formed in the upper portion of disc edge 45 instead of in the center thereof as is groove 6 for embodiments 1 and 30. Spark plug end receiving hole 42 is connected with curved slot 44 by an enlarged slot portion 46 for receiving portion 54 of terminal 55 to provide a complementary engagement of the spark plug end terminal with hole 42 and slot 44.

The construction of embodiment 40 enables the overall diameter of the disc-shaped body to be smaller than the previously described two embodiments without sacrificing the measurement capacity thereof, since the initial several inches of a spark plug wire are located within slot 44 of the disc-shaped body, requiring the total length of peripheral groove 43 to be less than that required for the grooves of embodiments 1 and 30. Embodiment 40 also is shown as having three circular indicating lines 47, 48 and 49 corresponding to spark plug wires having on the spark plug end a straight terminal 50, an L-shaped terminal 51 and an angled terminal 52 which may be represented by pictures or drawings thereof on the top surface of the disc-shaped body. Although most spark plug wires will either have a straight terminal 50 or L-shaped terminal 51, several models of engines and vehicles use angled terminals 52. A similar type of pictorial indicating indicia could be placed on the disc-shaped bodies of embodiments 1 and 30, if desired.

The operation of embodiment 40 is the same as that described above with respect to embodiments 1 and 30. The terminal at the distributor end of a spark plug wire is placed in hole 42 and the wire laid along curved slot 44 and peripheral groove 43 with the replacement part number being read directly from the disc surface adjacent the indicating mark thereon.

SUMMARY

The three embodiments of the spark plug wire measuring gauge set forth above provide a convenient structure which is formed inexpensively of a molded, rugged, lightweight plastic material, which has various manufacturers' replacement part numbers printed on either one or both sides of the disc-shaped body, enabling a mechanic to rapidly measure the linear length of an old spark plug wire by the length indications marked on the disc while simultaneously providing the mechanic with a selection of various manufacturers' replacement part numbers without any additional manipulation of the gauge or checking in a parts catalog, as heretofore required. The spark plug wire gauge is free of moving parts which are subject to breakage and damage as are prior art gauges for measuring other known types of vehicle accessories such as drive belts, and in which various advertising slogans, pictures and trademarks can be printed on one or both sides of the disc-shaped body of the gauge to enhance the desirability of the gauge.

The longest spark plug wires required for most vehicle engines is approximately 53 inches. Therefore, the disc of embodiments 1 and 30 has a diameter of approximately 18 inches, which provides sufficient linear length along the peripheral groove for nearly all spark plug wires. The diameter of embodiment 40 can be several inches smaller due to the initial takeup of the spark plug wire within curved slot 44 formed in the confines of the disc-shaped body.

Accordingly, the gauge construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the spark plug wire gauge is constructed and used, the characteristics of the construction, and the advantageous, new and useful results obtained, the new and useful structures, devices, elements, arrangements, parts, and combinations, are set forth in the appended claims.

I claim:

1. A gauge construction for measuring spark plug wires of the type having a pair of end terminals with a predetermined length of wire extending therebetween, said gauge construction including:
   (a) a generally disc-shaped body having an outer peripheral edge;
   (b) a groove formed in at least a portion of the outer peripheral edge;
   (c) means provided on the disc-shaped body for detachably holding one of the end terminals of a spark plug wire with the wire being adapted to be received in and laid along said edge groove; and
   (d) markings provided on the disc-shaped body at predetermined spaced locations along and adjacent to the peripheral edge groove for indicating the length of a spark plug wire placed in the groove by a particular one of the markings adjacent the other end terminal of the spark plug wire.

2. The gauge construction defined in claim 1 in which the disc-shaped body is molded of plastic.

3. The gauge construction defined in claim 1 in which the spark plug wire holding means is an opening formed in the disc-shaped body inwardly of the edge; and in which a slot is formed in the disc-shaped body and extends between the opening and edge groove.

4. The gauge construction defined in claim 3 in which the opening is formed at the center of the disc-shaped body; and in which the slot has a curved configuration extending between the opening and edge groove.

5. The gauge construction defined in claim 1 in which the spark plug wire holding means is an opening formed in the edge groove of the disc-shaped member.

6. The gauge construction defined in claim 1 in which the markings which are provided on the disc-shaped body indicate the linear length of a spark plug wire placed in the detachable holding means and extending along the groove.

7. The gauge construction defined in claim 6 in which the markings also include indicia printed on the disc-shaped body indicating replacement part numbers of various manufacturers.

8. The gauge construction defined in claim 7 in which the markings also include at least two arcuate lines and a plurality of spaced radially extending lines printed on the disc-shaped body; in which said arcuate lines are in close proximity to each other and to the peripheral edge of the disc-shaped body and extend along said edge; and in which said radially extending lines extend inwardly from and communicate with one of said arcuate lines.

9. The gauge construction defined in claim 1 in which the groove has a concave configuration.

10. A device for measuring spark plug wires including:
(a) a body;
(b) spark plug wire holding means formed on the body for detachably holding a spark plug wire in a predetermined curved path along said body; and
(c) marking means provided on the body at predetermined spaced locations with respect to the spark plug wire holding means for indicating the length of a spark plug wire extending along the curved path.

11. The device defined in claim 10 in which the spark plug wire holding means includes a hole formed in the body for receiving one end of a spark plug wire, and a groove formed in the body and extending in a generally circular manner along said body for receiving a spark plug wire therein.

12. The device defined in claim 11 in which the body has a disc-shaped configuration with an annular outer edge; and in which the groove is formed in the outer edge and extends generally about the periphery of the disc-shaped body.

* * * * *